United States Patent [19]

Royer

[11] Patent Number: 4,722,683
[45] Date of Patent: Feb. 2, 1988

[54] RETHERMALIZATION OVEN

[75] Inventor: Wayne H. Royer, Felton, Pa.

[73] Assignee: Vulcan-Hart Corporation, Louisville, Ky.

[21] Appl. No.: 2,974

[22] Filed: Jan. 13, 1987

Related U.S. Application Data

[63] Continuation-in-part of Ser. No. 839,732, Mar. 14, 1986, abandoned.

[51] Int. Cl.$^4$ .............................. F27B 9/04; F27B 3/22
[52] U.S. Cl. ...................................... 432/152; 432/146; 432/176; 432/144; 126/21 A
[58] Field of Search ................ 432/199, 176, 152, 144, 432/146; 126/21 A; 219/368, 400

[56] References Cited

U.S. PATENT DOCUMENTS

| | | | |
|---|---|---|---|
| 3,097,836 | 7/1963 | Beggs et al. | 432/199 |
| 3,537,405 | 11/1970 | Verhoeven | 432/152 |
| 4,012,190 | 3/1977 | Dicks et al. | 432/146 |
| 4,094,631 | 6/1978 | Grieve | 432/176 |
| 4,162,141 | 7/1979 | West | 432/152 |
| 4,484,063 | 11/1984 | Whittenburg et al. | 126/21 A |
| 4,492,569 | 1/1985 | Vestergaard | 126/21 A |
| 4,514,167 | 4/1985 | Royer | 432/11 |

Primary Examiner—Henry C. Yuen
Attorney, Agent, or Firm—Laubscher & Laubscher

[57] ABSTRACT

A rethermalization oven for heating food is disclosed, characterized by uniform distribution of heat and air through a heating chamber. The oven includes a housing and partitions for defining an outer U-shaped air plenum, a rectangular heating chamber, and a burner chamber. The side panels of the partition contain a plurality of spaced horizontal slots and the rear panel of the partition contains a plurality of spaced openings and horizontal slots of progressively increasing thickness in the directions toward the top and bottom of the housing. A heating element is arranged in the burner chamber for heating the air arranged therein. A plurality of cup baffles are connected with the housing side wall and extend across the rear leg portions of the air plenum adjacent each of the side panel slots to direct a portion of air from the air plenum chamber into the rear portion of the heating chamber through the rear portion of the slots, with the remaining portion of the heated air being uniformly distributed throughout the heating chamber via the slots. A blower including a single inlet/double outlet scroll circulates heated air from the burner chamber under pressure into the air plenum into the heating chamber via the slots, and back to the burner chamber.

16 Claims, 8 Drawing Figures

RETHERMALIZATION OVEN

This application is a continuation-in-part of application Ser. No. 839,732 filed Mar. 14, 1986, now abandoned.

BACKGROUND OF THE INVENTION

The present invention relates to an oven for reheating foods and for maintaining foods at a given temperature. The oven is particularly useful for heating a plurality of previously cooked meals for serving at a banquet or the like where a large number of meals or foods are served simultaneously. The invention is characterized by uniform air distribution over the food products arranged within a heating chamber for even cooking or heating of the food.

BRIEF DESCRIPTION OF THE PRIOR ART

Various ovens for heating or reheating food products are well-known in the patented prior art as evidenced by the U.S. Pat. Nos. to Stromqvist 3,439,665 and Ishammar 4,010,341. The Ishammar patent, for example, discloses a hot air oven for heating foods. The oven includes a heating cavity including an insert having a plurality of grids arranged therein. A feed air gap is provided on the sides of the insert and a plurality of gill openings allow hot air from the gaps to enter the insert adjacent the grids. The hot air is circulated by a centrifugal fan having one inlet and two outlets, and a heating element surrounds the fan to heat the air prior to recirculation to the insert.

Similarly, the Stromqvist patent discloses a food heating device including two areas for receiving receptacles containing food to be heated. A motor driven fan discharges air past heating elements where the air is heated and then to air delivery channels. A plurality of vertically spaced baffles are arranged in the air delivery channels for providing upward paths of flow for the heated air. The outer side walls of the heating areas contain slots or holes to divide the heated air into a plurality of streams which pass through the heating areas. The opposite inner side walls of the heating areas contain openings or slots for discharging air from the heating areas, with the discharged air being returned to the fan for recirculation.

While the prior devices normally operate satisfactorily, they all suffer from the inherent drawback of nonuniform distribution of heated air through the heated chamber. Accordingly, the heated chambers of the prior devices are characterized by hot and cold spots which results in uneven heating of the food products.

The present invention was developed in order to overcome these and other drawbacks of the prior devices by providing a rethermalization oven designed for uniform distribution of heated air through the heating chamber and across the food products arranged therein for even cooking or heating of the food.

SUMMARY OF THE INVENTION

Accordingly, it is a primary object of the present invention to provide a rethermalization oven for heating food including a generally rectangular housing defining a chamber open at the front end of the housing and a door connected with the housing for closing the chamber open end. A first partition is arranged within the housing and spaced from the side and rear walls thereof to divide the chamber into a first U-shaped portion or air plenum and a second rectangular portion or heating chamber. The first partition includes a pair of spaced side panels arranged parallel to the side walls of the housing. The side panels contain a plurality of spaced parallel horizontal through-slots. The first partition also contains a rear panel spaced from and arranged parallel to the housing rear wall and connected at its ends with the side panels. The rear panel contains a plurality of openings having a total area greater than the total area of the side panel slots. A second partition is connected with the housing and defines a third chamber portion or burner chamber behind the rear panel and spaced from the rear wall of the housing. The second partition contains a central opening. A heating device is arranged within the burner chamber for heating the air contained therein and a blower is arranged within the air plenum between the housing rear wall and the second partition for circulating heated air from the burner chamber through the air plenum. A plurality of curved cup baffles are connected with the housing side walls adjacent the rear portion of each of the side panel slots, respectively. The baffles are arranged within the air plenum and extend continuously between the housing side walls and the first partition side panels for deflecting a portion of the heated air from the air plenum into the rear portion of the heating chamber via the slots. When the heating device and blower are actuated, heated air is evenly distributed throughout the heating chamber to heat a food product arranged therein. Moreover, the pressure of the heated air within the air plenum is increased, owing to the lesser total area of the slots in the first partition side panels relative to the total area of the openings in the first partition rear panel. The increased pressure aids the uniform distribution of the heated air within the heating chamber.

According to a more specific object of the invention, the rear panel openings include a plurality of horizontal slots progressively increasing in width from the center of the panel toward the housing top and bottom walls, respectively, for further uniformity of air distribution.

According to a further object of the invention, the baffles are designed to deflect up to 30% of the heated air from the air plenum into the rear of the heating chamber. More particularly, the curvature of the baffles extends between 90° and 120° to direct heated air into the rear corners of the cooking chamber. The baffles also have a height generally twice the thickness of the side panel slots, whereby the pressure of the heated air intercepted by the baffles is increased to force the intercepted air through the adjacent slot rear portion.

According to yet another object of the invention, the second partition has a generally trapezoidal horizontal cross-sectional configuration, whereby the corners of the U-shaped air plenum are curved for even air flow.

It is a further object to provide a double outlet scroll device on the blower. The scroll outlets are tangentially arranged relative to the wheel or fan blade of the blower and serve to increase the pressure of the heated air within the air plenum relative to the burner chamber.

According to another object of the invention, a thermostatic control device controls the blower and the heating device to maintain a given temperature and pressure within the heating chamber.

BRIEF DESCRIPTION OF THE FIGURES

Other objects and advantages of the present invention will become apparent from a study of the following specification when viewed in the light of the accompanying drawing, in which.

DETAILED DESCRIPTION

Figure 1:
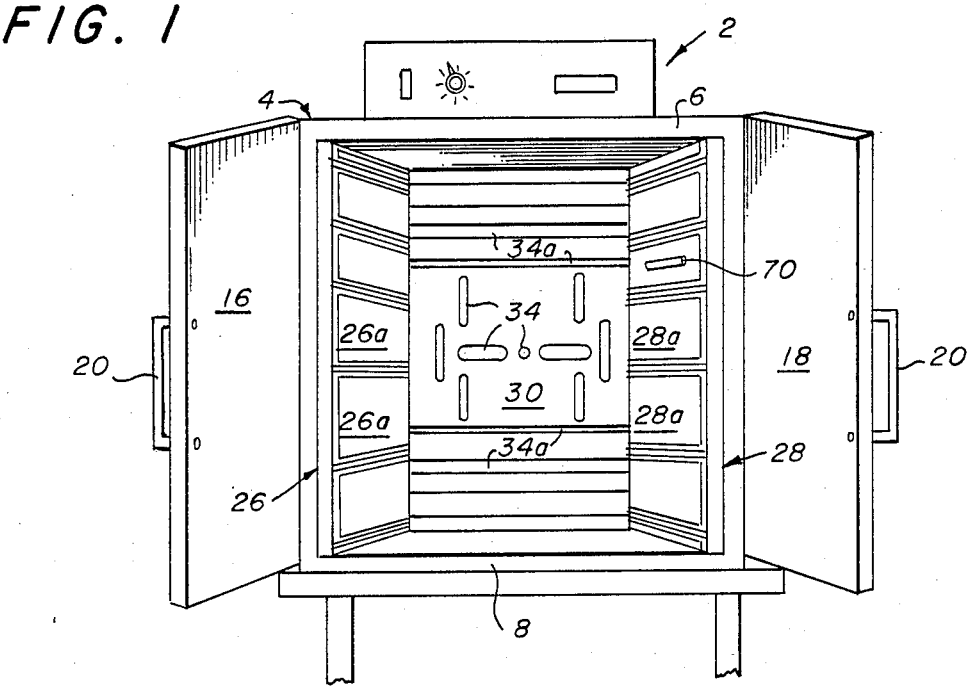
FIG. 1 is a front perspective view of the rethermalization oven according to the invention.

Referring first to FIGS. 1-4, the present invention relates to a rethermalization oven 2 for heating and/or cooking food products and the like. The oven includes a housing 4 having top 6, bottom 8, rear 10, and two side walls 12, 14 which define a chamber open at the front end of the housing. A pair of doors 16, 18 define the front wall of the housing and are pivotally connected with the housing side walls by hinges (not shown) to provide access and to close the housing chamber. Each door includes a handle 20 for opening and closing the same, and a locking latch may be provided to maintain the doors in the closed position.

Figure 3:
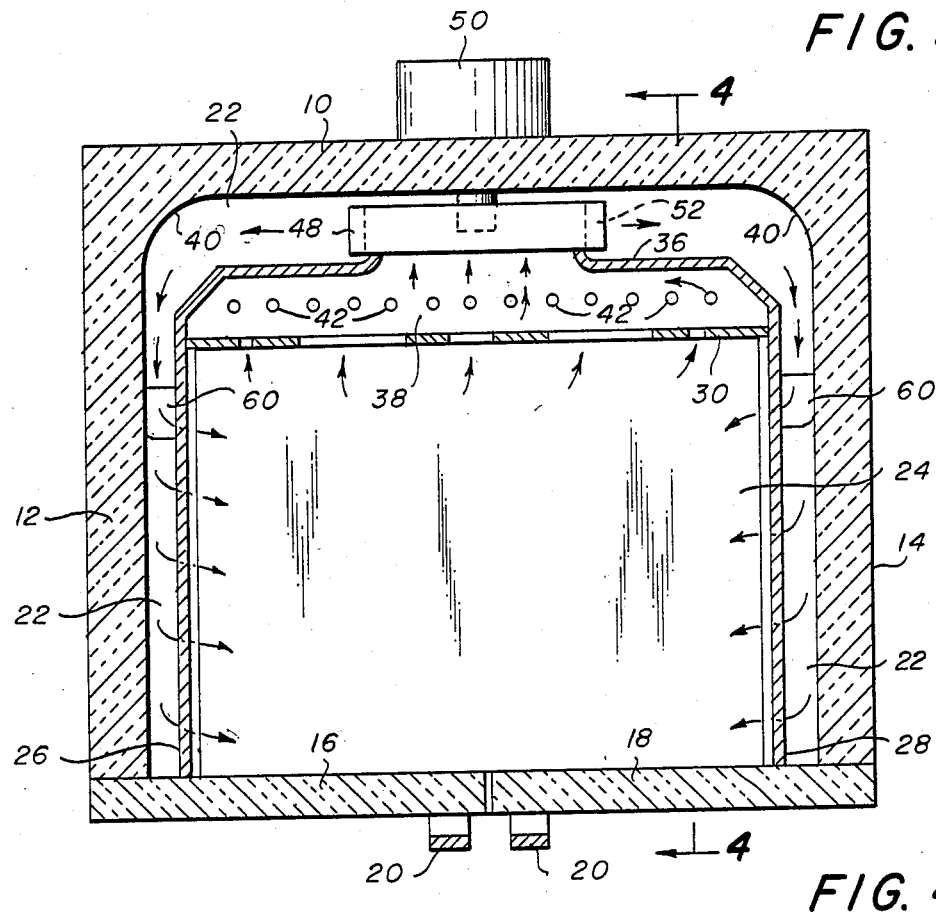
FIG. 3 is a sectional view of the oven taken along line 3—3 of FIG. 2.

As best shown in FIG. 3, the housing contains a first partition which divides the chamber into first 22 and second 24 portions. As will be developed in greater detail below, the first chamber portion comprises an air supply chamber or plenum and the second chamber portion comprises a heating chamber. The first partition has a generally U-shaped horizontal cross-sectional configuration, whereby the air plenum 22 is U-shaped and extends between the top 6, bottom 8, rear 10 and side 12, 14 walls of the housing and the first partition, and the heating chamber 24 is rectangular and extends between the top and bottom 8 walls of the housing and the first partition.

The first partition includes a pair of spaced parallel side panels 26, 28 connected between the top and bottom walls of the housing parallel to and spaced from the housing side walls. The first partition also includes a rear panel 30 extending between the housing top and bottom walls and arranged normal to the first partition side panels and spaced from the housing rear wall. The opposite ends of the rear panel are connected with the side panel by any suitable means such as welding.

Figure 2:
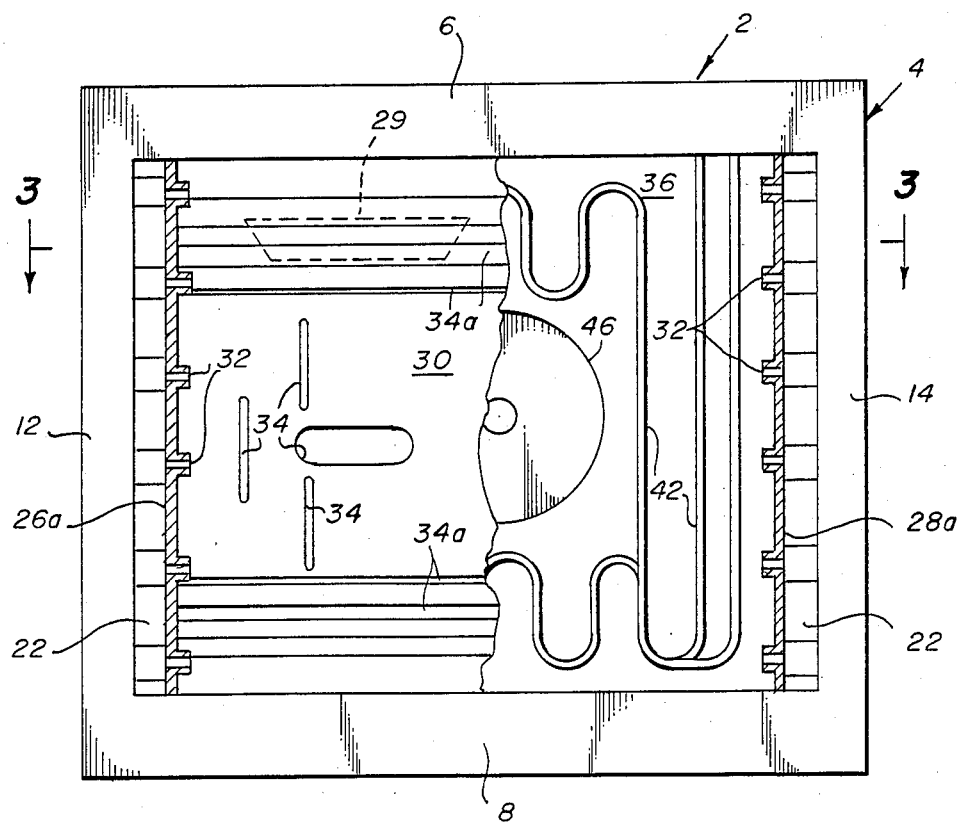
FIG. 2 is a partially cut away front view of the interior of the oven of FIG. 1.

The side panels preferably comprise a plurality of vertically spaced C-shaped panels 26a, 28a as shown more particularly in FIG. 2. The spaces between the panels comprise horizontal through-slots 32 with the slots of one side panel being arranged opposite corresponding slots in the other side panel. A portable rack carrier will have supports for food racks (not shown) which are arranged within the cooking chamber and upon which containers of food 29 to be heated are supported between the side panel slots.

The rear panel 30 contains a plurality of openings 34 which are arranged in the vertical central portion of the panel. The rear panel also contains a plurality of vertically spaced horizontal slots 34a of progressively increasing width in the direction from the center of the panel toward the housing top and bottom walls. The total area of the openings and slots in the rear panel is generally 5% greater than the total area of the slots 32 in the side panels for reasons to be discussed in greater detail below.

A second partition 36 having a generally trapezoidal horizontal cross-sectional configuration is connected between the housing top 6 and bottom 8 walls behind the first partition rear panel 30 and spaced from the housing rear wall 10 to define a third portion 38 of the housing chamber as shown in FIG. 3. As will be developed below, the chamber third portion 38 comprises a burner chamber.

The trapezoidal configuration of the second partition 36 rounds off the corners of the air plenum 22 adjacent the rear wall 10 of the housing. The junctions 40 of the housing rear and side walls are also preferably curved as shown in FIG. 3 to define a smooth surface which in turn defines the air plenum. Although separate side and rear walls may be provided for the housing, they are preferably integrally formed as a single unit.

Figure 4:
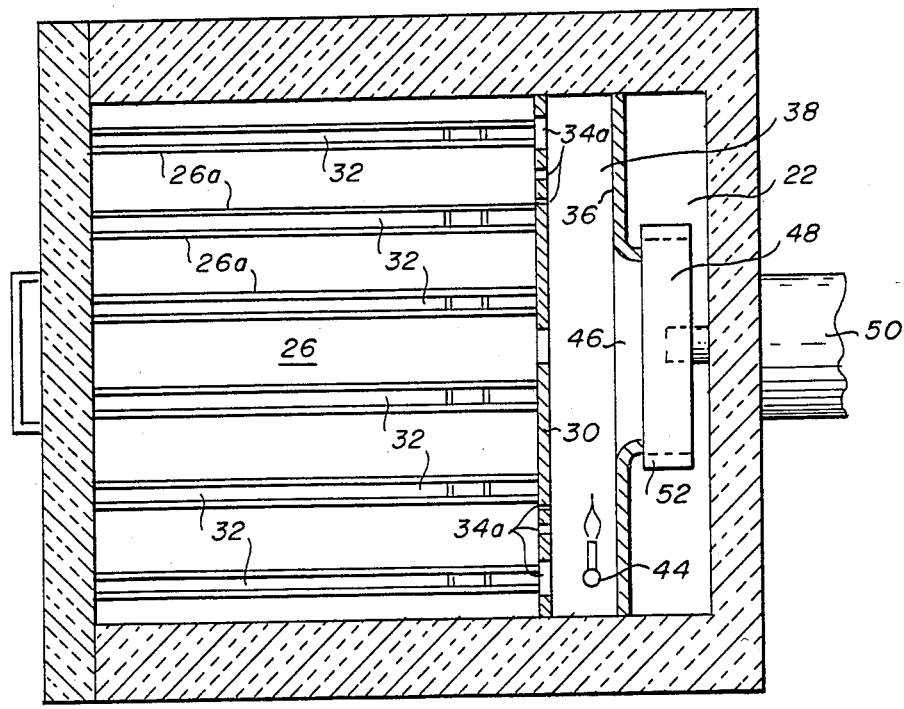
FIG. 4 is a sectional view of the oven taken along line 4—4 of FIG. 3, but having a different heating element.

A heating element such as an electric coil 42 is arranged within the burner chamber 38 for heating the air therein as shown in FIGS. 2 and 3. In lieu of the electric coil, a gas burner 44 may be provided as the heating element as shown in FIG. 4. The heating element is connected with the housing or with the second partition in a conventional manner (not shown).

Figure 8:
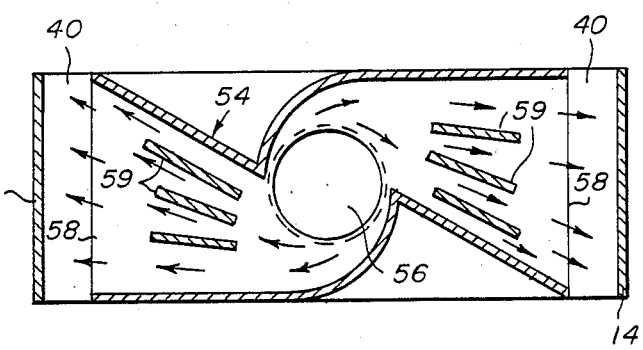
FIG. 8 is a front sectional view of the oven blower having a double scroll arranged in a U-shaped air plenum.

The second partition 36 contains a curved or venturi-like central opening 46 affording fluid communication between the burner chamber 38 and the air plenum 22. A blower 48 is connected with the housing rear wall 10 and arranged within the air plenum 22 opposite the opening 46 in the second partition 36. A motor 50 rotates a fan blade 52 of the blower. The blower includes an outer housing or double outlet scroll 54 as shown in FIG. 8. The scroll has a single air inlet 56 arranged opposite the second partition opening 46 and a pair of outlets 58 which direct air in opposite directions therefrom toward the curved portions 40 defining the air plenum. The wall portions of the scroll which define the scroll outlets 58 diverge tangentially from the outer peripheral portion of the fan blade shown by the broken line in FIG. 8. This configuration of the scroll results in an increase in pressure of the air at the scroll outlet and in the air plenum relative to the pressure of the air in the burner chamber for reasons to be discussed in greater detail below. Each scroll outlet contains vertically spaced baffles 59 to vertically distribute the air evenly through the U-shaped air plenum. Operation of the blower delivers air to the air plenum 22 and to the heating chamber 24 via the slots 32 in the first partition side panels. Air exits the heating chamber 24 through the first partition rear panel openings 34 to the burner chamber 38. Heated air from the burner chamber is drawn by the blower through the second partition opening 46 for recirculation to the air plenum.

A plurality of curved cup baffles 60 are connected with the housing side walls 12, 14 and extend continuously across the air plenum 22 to engage the rear portion of the side panels 26, 28. As shown in FIGS. 2 and 3, one baffle is connected with the side walls adjacent each slot 32 defined in the side panels. Furthermore, the baffles are vertically aligned and arranged in the rear side portions of the air plenum 22, and preferably in the rear third of the leg portions of the chamber 22, as shown in FIGS. 3 and 4 and as will be developed further below.

Figure 5:
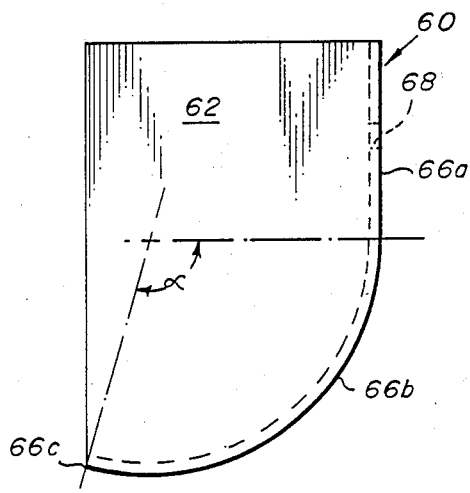
FIGS. 5, 6, and 7 are top, rear, and side views, respectively, of a baffle for the oven.
Figure 7:
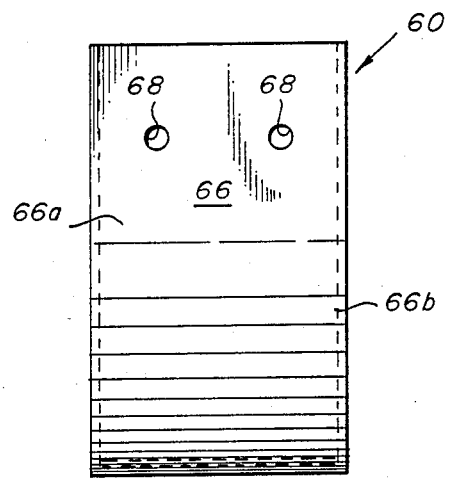
Figure 6:
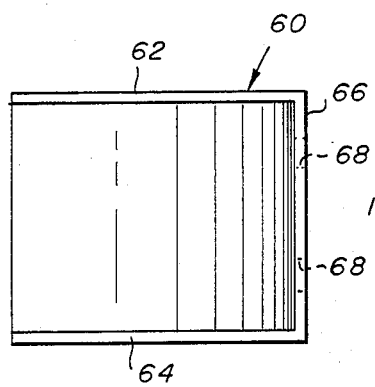

Referring now to FIGS. 5-7, each cup baffle includes a top wall 62, a bottom wall 64, and a side wall 66 arranged therebetween, the walls preferably being formed as an integral assembly from sheet metal or the like. As set forth above, the width of the baffles corresponds with the width of the space between the housing side walls and the first partition side panels. Furthermore, the height of the baffles is generally twice the thickness of the side wall slots 32. Each baffle side wall 66 includes a straight portion 66a and a curved portion 66b, the curved portion extending at an angle greater than 90° and less than 120°. The baffle side wall straight portion contains a pair of openings 68 for receiving screws, bolts, or the like for connecting the baffle with the housing side walls 12, 14.

The baffles 60 are connected with the side walls 12, 14 with the straight side wall portions thereof spaced from the side panels and with the edge 66c of the baffle side wall curve portion in contiguous engagement with the side panel outer surfaces. The baffles thus direct a portion of the heated air from the air plenum 22 into the rear portion of the heating chamber 24. More particularly, because the height of each baffle is roughly twice the thickness of the adjoining through-slot, the pressure of the heated air intercepted by the baffle is increased in the cup portion of the baffle. This increase in pressure serves to force the air through the slot portion adjacent the baffle edge 66c and into the rear corners of the heating chamber. The remainder of the heated air from the air plenum which is not intercepted by the baffles is delivered to the rest of the interior of the heating chamber via the slots 32.

The location of the baffles relative to the front and rear portion of the housing is determined by the deflection of air into the heating chamber. More particularly, the baffles are located so as to direct a sufficient volume of heated air from the air plenum leg portions on either side of the heating chamber into the rear corner portions of the heating chamber in order to provide uniform air circulation and temperature distribution within the heating chamber 24. Experimentation has shown that when the baffles are arranged in the rear 15-20% of the air plenum leg portions, the baffles on both sides of the heating chamber jointly deflect roughly 30% of the heated air from the double outlet blower into the rear corners of the heating chamber, with the remaining air entering the heating chamber via the remaining portion of the slots 32. This arrangement provides the desired uniform circulation and temperature distribution within the heating chamber.

A thermostat 70 is connected with the inner surface of one side panel of the first partition for sensing the temperature of the heating chamber 24. A control device 72 is connected with the housing and includes an on/off switch, a fan control switch, and a temperature control mechanism. The control device and the thermostat cooperate in a conventional manner to control the operation of the heating element and the blower.

In operation, one or more containers 29 of food to be heated are placed in the heating chamber 24 and the doors 16, 18 of the rethermalization oven are closed. The control device is programmed to energize the heating element 42 and the blower 48. Hot air from the burner chamber 38 which has been heated by the heating element is drawn through the second partition opening 46 as shown by the arrows in FIG. 3 into the scroll 54 of the blower via the opening 56. The heated air is directed from the scroll outlet openings 58 at an increased pressure in opposite directions into the two leg portions of the U-shaped air plenum 22 after passing around the curved portion 40 of the housing. A portion of the heated air is directed by the baffles 60 into the rear corners of the heating chamber 24 via the slots 32. The remaining portion of the heated air is distributed evenly throughout the heating chamber 24 via the slots 32. Thus heated air enters the heating chamber from both side panels and is evenly distributed around the food containers for uniform heating thereof. Air is drawn from the heating chamber 24 into the burner chamber 38 via the openings 34 and slots 34a in the first partition rear panel 30 by the blower where the air is reheated and recirculated. Owing to the progressively greater width of the slots 34a toward the top and bottom walls of the housing, a larger quantity of air from the heating chamber is drawn across the upper and lower heater coils in the burner chamber for reheating prior to passing through the rear opening 46 to the blower 48. Furthermore, the size and configuration of the rear panel slots and openings causes an equilization of pressure within the burner chamber relative to the heating chamber.

Because the rear panel openings 34 and slots 34a have a total area greater than the area of the side panel slots, and because of the configuration of the double outlet scroll 54, the pressure of the hot air within the air plenum increases. This increase in pressure aids in the uniform distribution of air and heat into the heating chamber to further enhance uniform heating of the food product. The air pressure in the heating chamber may be varied by varying the operating speed of the motor 50 via the control device. Furthermore, the temperature within the heating chamber may be varied by controlling the operation of the heating element via the control device in response to the temperature sensed by the thermostat.

Although the thickness of the rear portion of the U-shaped air plenum 22 is illustrated in FIG. 3 as being greater than the thickness of the side or leg portion of the air plenum chamber, it will be appreciated by those skilled in the art that the portions may be of equal thickness, so long as the pressure of the circulated air is greater within the air plenum than within the heating chamber so that air is forced into the heating chamber through the side panel slots.

The housing and doors are preferably formed of a heat insulated metal so that the exterior of the housing is prevented from becoming hot. The panels of the first partition, the second partition, and the baffles are all formed of a suitable material such as sheet metal.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:
1. An oven for heating foods and the like, comprising
 (a) a housing having a generally rectangular cross-sectional configuration and including top, bottom, front, side and rear walls defining a chamber;
 (b) first partition means arranged within and connected with said housing for dividing said chamber into first and second portions, said first partition means comprising
  (1) a pair of spaced side panels spaced from and parallel to said housing side walls, respectively, each of said side panels containing a plurality of spaced parallel horizontal through-slots, respectively; and (2) a rear panel arranged normal to said side walls and spaced from said housing rear wall, the opposite ends of said rear panel being connected with said side panels, respectively, to define said chamber second portion, said rear panel containing a plurality of openings extending over a major portion thereof and having a total area greater than the total area of said side panel slots;

(c) second partition means connected with said housing and in spaced relation with said rear panel for defining a third portion of said chamber behind said rear panel and spaced from the rear wall of said housing, said second partition means containing a central opening;

(d) heater means connected with said housing and arranged within said chamber third portion for heating the air contained therein;

(e) a plurality of cup baffles connected with said housing side walls adjacent the rear portion of each of said side panel slots, respectively, said cup baffles being arranged within said chamber first portion and extending between said housing side walls and said first partition side panels; and (f) blower means arranged within said first chamber portion, said blower means having a single inlet concentric with said second partition central opening for drawing heated air directly from said chamber third portion and a pair of opposed horizontal outlets for directing said heated air toward said housing side walls for circulating said heated air through said chamber first portion between said housing side walls and said first partition side panels, said cup baffles deflecting a portion of said heated air into the rear corners of said second chamber portion with the remaining portion of said heated air being circulated through said second chamber portion via said slots, whereby uniform air circulation and temperature distribution is provided within said chamber second portion for heating food products arranged therein.

2. Apparatus as defined in claim 1, wherein said rear panel openings include a plurality of horizontal slots progressively increasing in width from the center of said panel toward said housing top and bottom walls, respectively, thereby to provide further uniformity of air distribution.

3. Apparatus as defined in claim 2, wherein said second partition means has a generally trapezoidal horizontal cross-sectional configuration, whereby said chamber first portion has curved corners for even air flow.

4. Apparatus as defined in claim 3, wherein said side panel slots are of equal width and are evenly spaced along the height of said side panels, said slots of one side panel being arranged opposite corresponding slots of the other side panel, whereby a container for a food product to be heated may be arranged between said side panel slots.

5. Apparatus as defined in claim 4, wherein said rear panel slots are vertically offset relative to said side panel slots.

6. Apparatus as defined in claim 2, wherein said blower means includes a double scroll comprising the double outlet of said blower means, said scroll having outlets tangentially arranged relative to said blower means, thereby increasing the pressure of said heated air within said chamber first portion relative to said chamber third portion.

7. Apparatus as defined in claim 6, wherein said scroll outlets contain spaced baffles for vertically distributing the heated air through said chamber first portion.

8. Apparatus as defined in claim 7, wherein the total area of said rear panel openings is generally five percent greater than the total area of said side panel slots, thereby to provide pressure equilibrium within said chamber third portion for efficient heating of said air by said heater means.

9. Apparatus as defined in claim 2, and further comprising thermostatic control means for controlling said heating means and said blower means to maintain a desired temperature and pressure within the chamber second portion.

10. Apparatus as defined in claim 1, wherein said baffles each include top and bottom walls, respectively.

11. An oven for heating foods and the like, comprising (a) a housing having a generally rectangular cross-sectional configuration and including top, bottom, front, side and rear walls defining a chamber;

(b) first partition means arranged within and connected with said housing for dividing said chamber into first and second portions, said first partition means comprising (1) a pair of spaced side panels spaced from and parallel to said housing side walls, respectively, each of said side panels containing a plurality of spaced parallel horizontal through-slots, respectively; and (2) a rear panel arranged normal to said side walls and spaced from said housing rear wall, the opposite ends of said rear panel being connected with said side panels, respectively, to define said chamber second portion, said rear panel containing a plurality of openings extending over a major portion thereof and having a total area greater than the total area of said side panel slots;

(c) second partition means connected with said housing and in spaced relation with said rear panel for defining a third portion of said chamber behind said rear panel and spaced from the rear wall of said housing, said second partition means containing a central opening;

(d) heater means connected with said housing and arranged within said chamber third portion for heating the air contained therein;

(e) a plurality of cup baffles connected with said housing side walls adjacent the rear portion of each of said side panel slots, respectively, said cup baffles being aranged within said chamber first portion and extending between said housing side walls and said first partition side panels, the height of said cup baffles being generally twice the thickness of said side panel slots; and (f) blower means arranged within said first chamber portion, said blower means having a single inlet concentric with siad second partition central opening for drawing heated air from said chamber third portion and a pair of opposed horizontal outlets for directing said heated air toward said housing side walls for circulating said heated air through said chamber first portion between said housing side walls and said first partition side panels, said cup baffles intercepting a portion of said heated air and increasing the pressure thereof to deflect said portion of heated air at an increased velocity through the rear portion of the adjoining slots, respectively, into the rear corners of said second chamber portion with the remaining portion of said heated air being circulated through said second chamber portion via the remaining portion of said slots, whereby uniform air circulation and temperature distribution is provided within said chamber second portion for heating food products arranged therein.

12. Apparatus as defined in claim 11, wherein approximately thirty percent of the heated air circulating through said chamber first portion is deflected by said cup baffles into the rear portions of said chamber second portion.

13. Apparatus as defined in claim 12, wherein said cup shaped baffles each have a curvature extending between 90° and 120°, thereby to direct heated air into the rear corners of said chamber second portion.

14. Apparatus as defined in claim 13, wherein said baffles each include top and bottom walls, respectively.

15. Apparatus as defined in claim 14, wherein said housing front wall comprises at least one door providing access to said housing second portion.

16. An oven for heating foods and the like, comprising
   (a) a housing having a generally rectangular cross-sectional configuration and including top, bottom, front, side and rear walls defining a chamber;
   (b) first partition means arranged within and connected with said housing for dividing said chamber into first and second portions, said first partition means comprising
      (1) a pair of spaced side panels spaced from and parallel to said housing side walls, respectively, each of said side panels containing a plurality of spaced parallel horizontal through-slots, respectively; and
      (2) a rear panel arranged normal to said side walls and spaced from said housing rear wall. the opposite ends of said rear panel being connected with said side panels, respectively, to define said chamber second portion, said rear panel containing a plurality of openings extending over a major portion thereof and having a total area greater than the total area of said side panel slots;
   (c) second partition means connected with said housing and in spaced relation with said rear panel for defining a third portion of said chamber behind said rear panel and spaced from the rear wall of said housing, said second partition means containing a central opening;
   (d) heater means connected with said housing and arranged within said chamber third portion for heating the air contained therein;
   (e) a plurality of cup baffles connected with said housing side walls adjacent the rear portion of each of said side panel slots, respectively, said cup baffles being arranged within said chamber first portion and including a straight portion parallel to said housing side walls and a curved portion extending at an angle between 90° and 120° from said straight portion and in contact with said side panels, respectively; and
   (f) blower means arranged within said first chamber portion and having a single inlet concentrically arranged and in direct communication with said second partition central opening and a pair of opposed horizontal outlets, said blower means drawing heated air from said chamber first portion and directing it through said chamber first portion between said housing side walls and said first partition side panels, said cup baffles intercepting a portion of said heated air and increasing the pressure thereof to deflect said portion of heated air at an increased velocity through the rear portion of the adjoining slots, respectively, into the rear corners of said second chamber portion with the remaining portion of said heated air being circulated through said second chamber portion via the remaining portion of said slots, whereby uniform air circulation and temperature distribution is provided within said chamber second portion for heating food products arranged therein.

* * * * *